Figure 9:
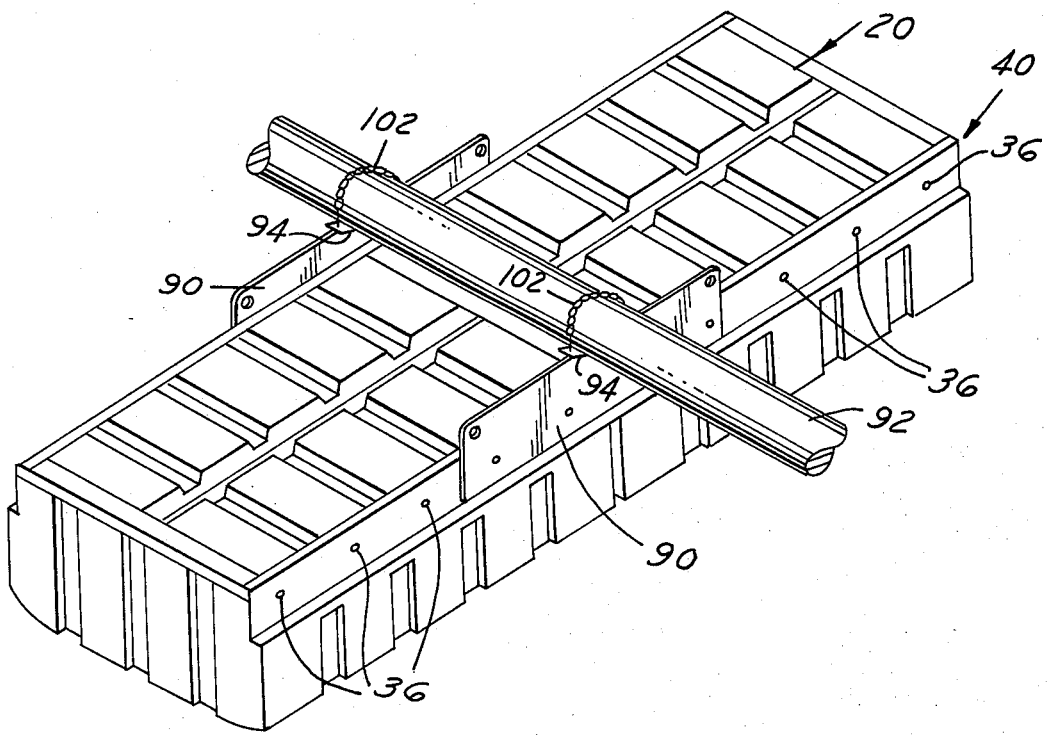

United States Patent [19]

Heinrich

[11] 4,365,577
[45] Dec. 28, 1982

[54] FLOAT MODULE COMBINATION

[76] Inventor: Edgar W. Heinrich, 23352 Lowrie Dr., Grosse Ile, Mich. 48138

[21] Appl. No.: 214,028

[22] Filed: Dec. 8, 1980

Related U.S. Application Data

[63] Continuation-in-part of Ser. No. 827,940, Aug. 26, 1977, abandoned.

[51] Int. Cl.$^3$ .................... B63B 35/34; B63B 35/38
[52] U.S. Cl. .................... 114/267; 405/219
[58] Field of Search ......... 114/264, 266, 267, 263; 405/219, 171; 411/548

[56] References Cited

U.S. PATENT DOCUMENTS

| | | | |
|---|---|---|---|
| 2,552,004 | 5/1951 | Erdman | 411/548 X |
| 3,091,203 | 5/1963 | Usab | 114/266 |
| 3,173,522 | 3/1965 | Zimmer et al. | 411/548 X |
| 3,552,424 | 1/1971 | Thompson | 114/263 X |
| 3,696,412 | 10/1972 | Swanson | 411/548 X |
| 3,921,238 | 11/1975 | Johnson | 114/267 X |
| 3,967,569 | 7/1976 | Shorter, Jr. | 114/266 |
| 4,041,716 | 8/1977 | Thompson | 114/266 X |

Primary Examiner—Sherman D. Basinger

[57] ABSTRACT

A dock float construction for supporting dock planks, floating platforms, piers, dredge pipes and the like which is constructed of high strength plastic and buoyant foam material with or without a hollow center and having a sealing skin, each float module having a top edge recess or bench for vertical structural elements with transverse fastening rods anchored in the modules to join modules to functional units.

2 Claims, 12 Drawing Figures

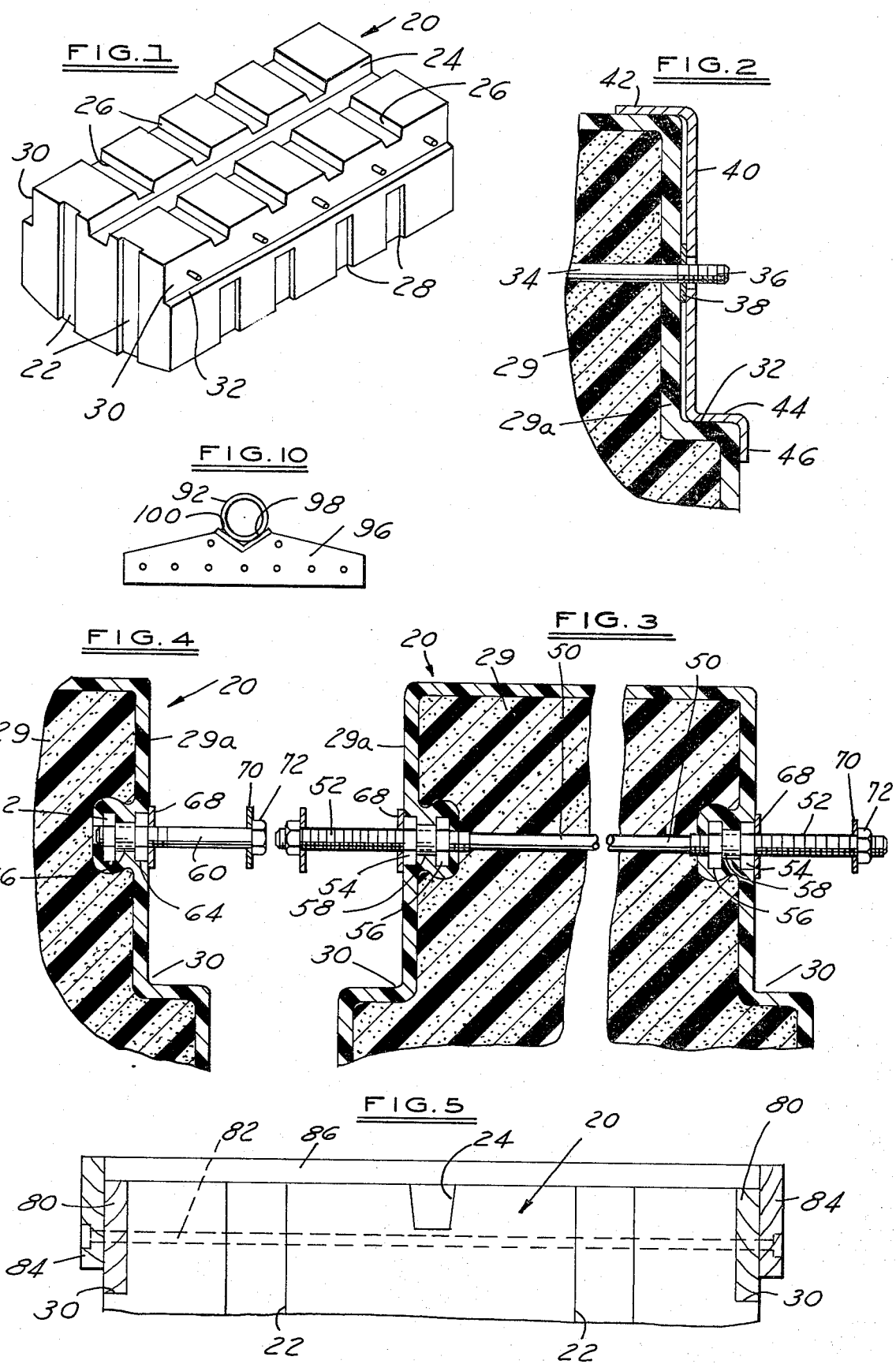

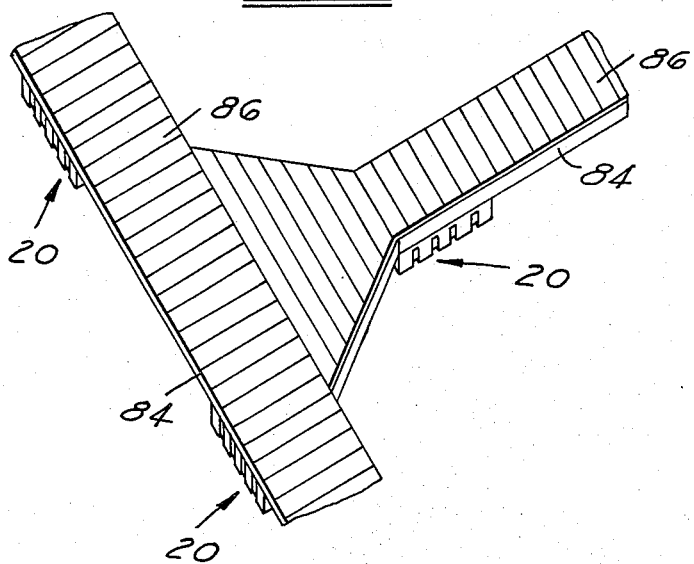
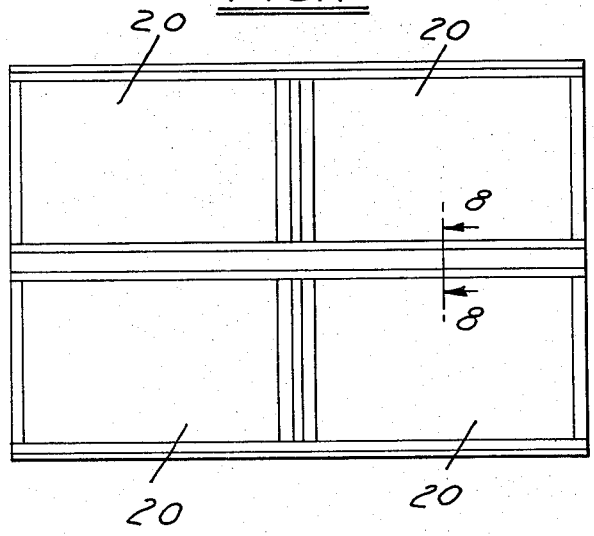
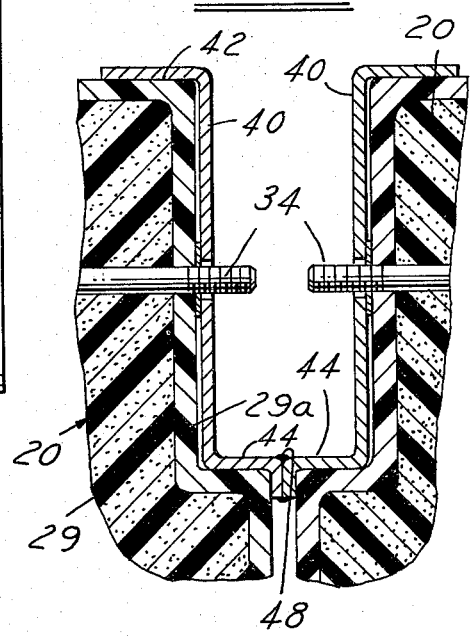

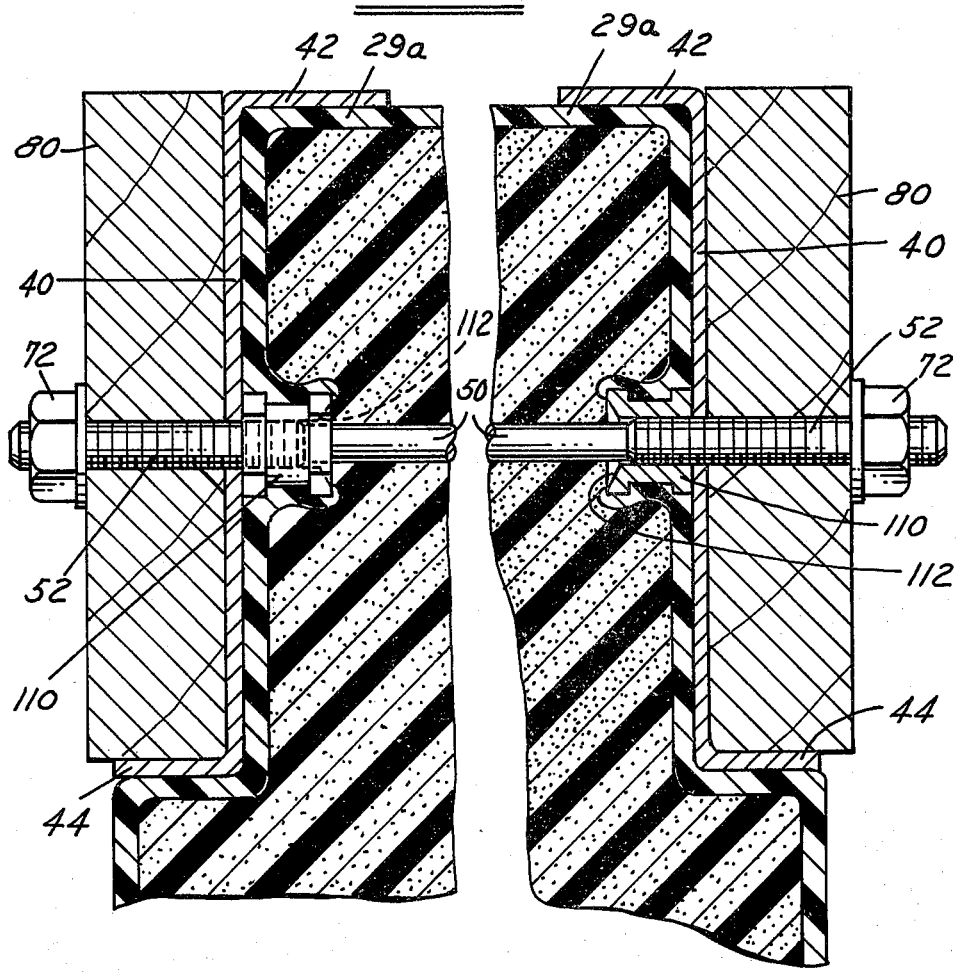

FLOAT MODULE COMBINATION

This application is a continuation-in-part of my co-pending application, Ser. No. 827,940, filed Aug. 26, 1977, and now abandoned.

This invention relates to a Float Module Combination and more particularly to a float module shaped and designed to have a load supporting ledge or bench with fastening elements to insure stability, rigidity, resist stresses and strain and provide for quick assembly.

The float module is useful for supporting dock planks, floating piers and platforms, dredge pipes, anchor buoys and the like. It is an object to provide a float module which, though light in construction, can be securely fastened to cross beams and other structural members to provide composite floating structures with maximum strength.

It is a further object to provide a float module with structural fastening devices molded and inserted into the module to facilitate fastening in a manner to lend strength to the module.

Other objects and features of the invention relating to details of construction will be apparent in the following description and claims in which is found a description of the invention together with details to enable persons skilled in the art to practice the invention, all in connection with the best mode presently contemplated by the inventor.

DRAWINGS accompany the disclosure and the various views thereof may be briefly described as:

FIG. 1, a perspective view of a float module.

FIG. 2, a sectional view showing the internal construction.

FIG. 3, a sectional view showing a modified construction.

FIG. 4, a further modification of a fastening element.

FIG. 5, an end view of an assembly.

FIG. 6, a view of a pier construction.

FIG. 7, a view of a composite assembly.

FIG. 8, a partial section on line 8—8 of FIG. 7.

FIG. 9, a view of a dredge pipe adaptation.

FIG. 10, a modified pipe gusset plate.

Figure 11:
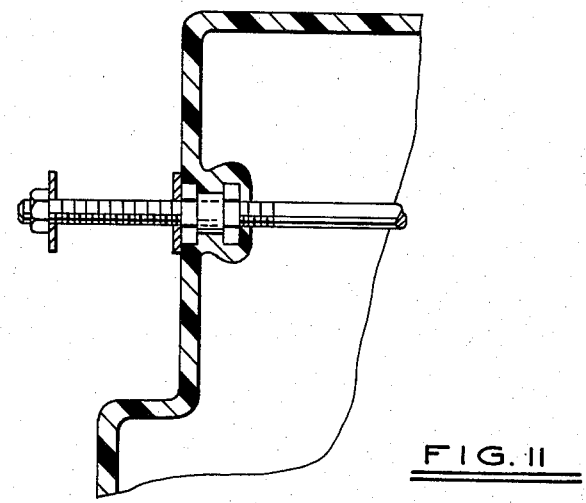

FIG. 11, a view of a hollow shell utilizing only the high density plastic material.

FIG. 12, a sectional view showing a modified wall insert to facilitate threading of the rod.

In FIG. 1, a buoyant block 20 is illustrated of generally rectangular shape having end flutes 22, a central flute 24 on the top, sometimes called a hat groove, and transverse flutes 26 on the top surface. The purpose of these top flutes is to provide strength to the block and to provide space between the block and assembled structure to run utility pipes, electrical conduct and cables, and the like. There are also side flutes 28 extending part way up from the bottom of the unit.

The block is preferably formed of an impervious, extremely tough, waterproof shell material 29a of polyurethane, rotational molded plastic available from Phillips Petroleum Co. and having a trade name of Marlex Polyolefins CL 50 or CL 100, a high density crosslinked plastic or its equivalent. Technical Bulletin No. 17 of the Phillips Petroleum Co. describes the Rotational Molding of Polyethylenes. The shell generally has a thickess range of 0.15" plus or minus to 0.375" plus or minus. The thickness is shown in the drawings in slightly exaggerated dimension. The block has a recess along each top longitudinal edge at 30, this recess being open at the top and the ends and terminating in a ledge or bench 32. Each block is also provided with a fastening means for securing structural elements into the recesses 30. The block may, in some applications, be composed only of the high density plastic shell 29, FIG. 11 a hollow block which has sufficient structural strength to serve for the purpose intended.

In most cases, the shell 29a is filled, after it is molded, with urethane foam 29 which is introduced in flowable form into the shell and expanded and cured while the shell is confined externally to prevent bulging or distortion. This provides a rigid foam reinforcement to the outer shell. This adds strength to the unit and prevents the introduction of water in the event the shell is accidentally or maliciously perforated.

In FIG. 2, a shaft 34 extends through the entire block having a threaded end 36 projecting into the recess past a washer 38. In FIG. 2, there is also shown a double flanged structural plate having a first vertical portion 40 lying parallel to the vertical recess wall 30 with an overlap flange 42 at the top overlying a portion of the block and a base flange 44 resting on the bottom of the recess 30 on ledge 32. An overlap flange 46 also extends down over the side wall of the block.

In FIG. 8, this construction is shown wherein the two plates 40 are welded at the root at 48 where flanges 44 meet to join two blocks together. There may also be interposed in the resulting well a plank or other structural element cooperating with the fastening means 34 to assist in the construction of a pier or other floating platform.

In FIGS. 3 and 4, modified fastening elements are illustrated. In FIG. 3, a transfixing shaft 50 has threaded ends 52, the threaded portion of the shaft being slightly larger in diameter than the central portion. An internally threaded insert composed of hexagonal nuts 54 and 56 with an integral spacer 58, is threaded on to the root of the threaded portion, leaving the ends of the threaded portions projecting into the recesses 30 and beyond the side walls of the block. This structural insert 54–56 is embedded in the high density plastic wall 29a of the block as it is molded. Thus, the fastening elements are well secured in the block to be used to fasten plates and beams in the recess 30. The shaft 50 is preferably formed of stainless steel or galvanized to resist corrosion. With the central portion of the shaft slightly smaller in diameter than the internal diameter of the threaded insert, the rods or shafts may be installed after the shell is formed. One threaded end is screwed through one insert and then the shaft may be pushed through the block to the other insert and the leading end screwed into that insert. The shaft or rod 50, as one example, is 7/16" in diameter with a thread rolled on each end to $\frac{1}{2} \times 13$. The threaded inserts have a $\frac{1}{2}" \times 13$ internal thread which is 0.015" oversize relative to the rod threads.

A modified structure is shown in FIG. 4 in which a stub shaft 60 has the insert with hexagonal or octagonal nuts 62 and 64 integral with spacer 66 embedded into the plastic as it is molded. The embedded insert has an inside diameter threaded hole, slightly oversize, to receive the threaded shaft 60 and may have a multi-faced (or hexagon) outside diameter on the spacer 66 to insure a tight and secure embedment. Suitable washers 68 are utilized on the outside of the structure with a washer 70 and a nut 72 to secure structural elements to the block in the recess 30.

In FIG. 5, a pier construction is shown in which the block 20 has a side plank 80 in the recess 30 transfixed by the shaft 82. A second side plank 84 is also held in place by the transfixing shaft 82 and top laterals 86 are suitably secured between the side planks 84.

In FIG. 6, a completed pier is shown with the buoyant blocks 20 supporting each end and a central portion, this construction being that shown in FIG. 5.

A plan view of the structure described in connection with FIG. 8 is shown in FIG. 7 wherein it will be seen that four individual block modules 20 may be joined in a composite structure to provide high buoyancy for any particular area. The parts may be joined as shown in FIG. 8 and similarly used for a pier construction as illustrated in FIG. 6.

In FIG. 9, a structure is shown wherein a buoyancy block 20 may be used to support a dredge pipe. These pipes are used in connection with the dredging of shipping channels and harbors to take away the sludge that is pulled up from the bottom. In this case, a side flange 40, as illustrated in FIG. 2, for example, may be utilized, this being secured to one or more buoyancy blocks by the fastening elements 36. Central of this assembly is a gusset plate 90 welded or bolted to the plate 40 having a supporting recess for a pipe 92. This recess may be semi-circular in configuration with a central strip 94 overlying the semi-circular recess or it may be a structure as shown in FIG. 10 in which a gusset member 96 has a V-shaped opening 98 with an overlying resting strip 100 to support the pipe 92. A suitable strap or chain 102 is secured to the gussets to hold the pipe in place. This can be a removable connection, if desired, so that the pipes can be readily released from the float when desired.

In FIG. 12, a sectional view of a modified float cell is illustrated with the two opposed sides brought close together for purposes of illustration as in FIG. 3. In this modification, the threaded inserts 110 in the opposed walls are formed on the inner sides with an inlet mouth 112 having an opening with a diameter greater than the threaded opening in the insert and tapering down to the threaded opening to form a funnel-like opening. When one threaded end 52 of a rod is threaded through one insert and pushed across to the other side of the cell the funnel mouth 112 on the inside of the inserts 110 makes it easy to guide the advanced threaded rod end into the opposed insert.

I claim:

1. A float module for construction of pier assemblies, floating platforms and the like which comprises:
    (a) a structure having high buoyancy, weather-resistant, and waterproof characteristics,
    (b) a structural recess formed along parallel edges of said structure open at the top and ends to provide a bench extending along the sides of said structure parallel to and spaced downwardly from the top,
    (c) fastening means embedded in said structure having portions extending into said recess above said bench, and adapted to transfix and lock to a structural element lying in said recess,
    (d) a structural element in the form of a flanged metal plate having a first portion lying against the back of said recess and a flanged portion lying against said bench, said first portion being transfixed by said fastening means, and
    (e) a vertical supporting gusset secured to said first portion of said structural element having a saddle recess on the top portion thereof for receiving and securing a dredge pipe.

2. A float module for construction of pier assemblies, floating platforms and the like which comprises:
    (a) a block-like floating cell defining a sealed, buoyant housing having end walls, a top wall, a bottom wall and side walls formed from a high density molded plastic material, said cell having a relatively deep narrow recess formed along the top of the side walls to provide a bench extending along the sides of the cell parallel to and spaced downwardly from the top wall and shaped to receive an elongate structural element rectangular in cross-section positioned vertically on edge in said recess,
    (b) an elongate, relatively rigid structural element rectangular in cross-section positioned on edge in each said recess formed of material to which other elements may be secured,
    (c) fastening means anchored in said cell extending into said recesses above said bench and transfixing said structural elements to secure said elements in said recess against said cell, and
    (d) a metallic structural element in the form of a flanged metal plate having a first portion lying against the back of said recess and a flanged portion lying against said bench, said first portion being transfixed by said fastening means, said portions of said metallic structural element each having a reinforcing flange extending respectively over the top and side of said structure adjacent said recess.

* * * * *